൹nited States Patent Office 2,978,963
Patented Apr. 11, 1961

2,978,963
MACHINE FOR PRODUCING GEARS

Harry Pedersen, Rochester, N.Y., assignor to The Gleason Works, Rochester, N.Y., a corporation of New York Filed July 1, 1959, Ser. No. 824,321

14 Claims. (Cl. 90—2)

The present invention relates to machines for producing gears and especially to such machines of the type having a reciprocating tool and a former which guides the feed motion of the tool and thereby determines the tooth profile shape.

The object of the invention is a machine of this kind having a simple yet effective means for imparting a supplemental motion to the tool, to vary its cutting depth in a controlled manner as it traverses the tooth being cut, to thereby crown the tooth from end to end to a selected degree.

A machine constituting the preferred form of the invention comprises a frame, a tool guide arm mounted for infeed motion on the frame to move the tool depthwise of the gear tooth being cut, a tool-carrying slide reciprocable on the arm in a direction lengthwise of the tooth, the arm also being movable on the frame in a direction approximately at right angles to the infeed motion and to the slide reciprocation to cause the tool to shape the tooth profile, a former on the frame and a former follower on the arm for effecting such profile shaping motion as the infeed motion proceeds, the former follower being on a carrier which is movable on the arm to effect a supplemental motion of the arm for varying the cutting depth of the tool, and means operable by and upon reciprocation of the slide for moving said carried back and forth on the arm.

The preferred embodiment of the invention as applied to a machine for cutting bevel gears is shown in the accompanying drawings, wherein.

Figure 1:
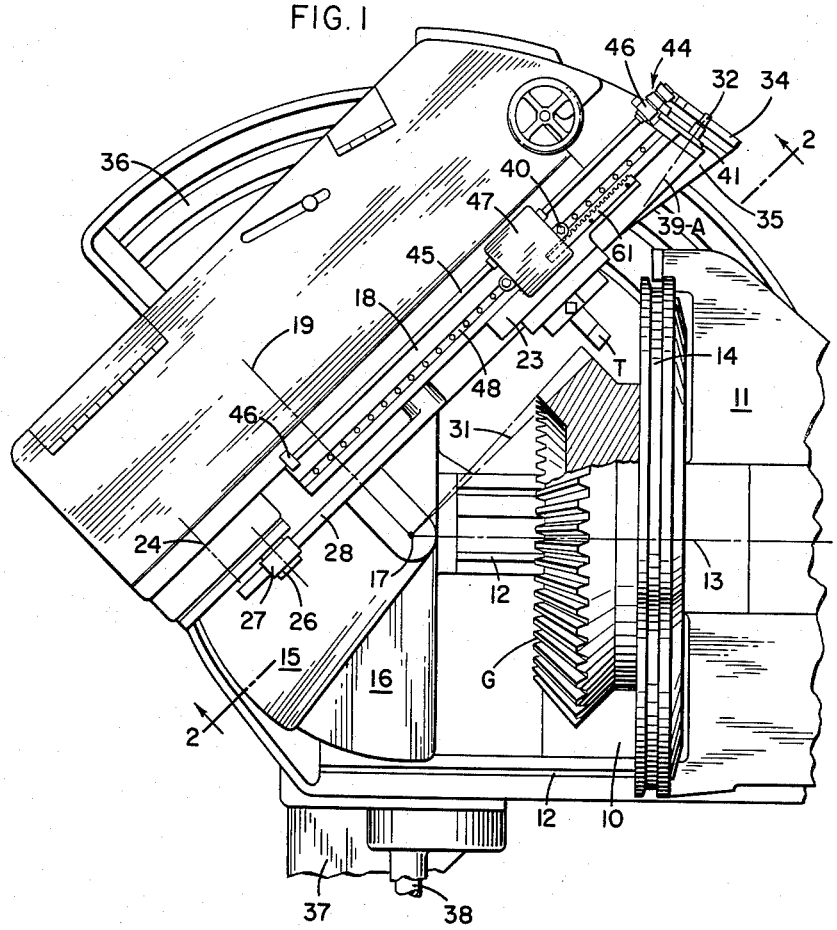
Fig. 1 is a fragmentary plan view of the machine.
Figure 2:
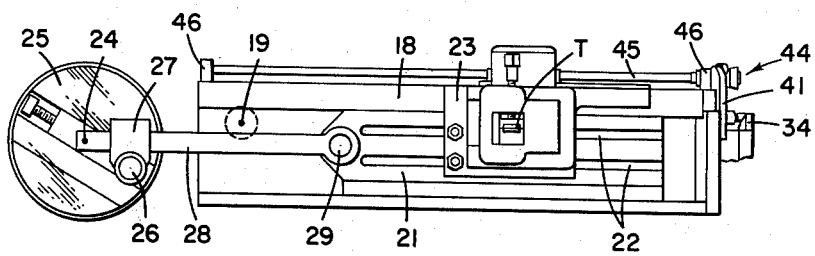
Fig. 2 is a front elevation of the tool guide arm and related parts, as viewed in plane 2—2 of Fig. 1.

The basic machine is of a well-known kind whose prototype was disclosed in U.S. Patent 175,859. It comprises a frame 10 on which a work head 11 is adjustable horizontally along ways 12. The work head journals a work spindle for rotation about axis 13, parallel to ways 12. On the spindle there is a face plate 14 for mounting a gear or gear blank G whose teeth are to be cut. A circular slide 15 is movable, upon circular guide plate 16 of frame 10, about a vertical axis 17 which intersects the work axis 13. To this slide a tool guide arm 18 is pivoted for angular motion about a horizontal axis 19 which intersects axes 13 and 17 at a common point. This point coincides with the cone apex of the work gear G. A tool slide 21 is reciprocable on arm 18 and has guide slots 22 along which a tool block 23 is adjustable, the block carrying the cutting tool T.

The tool slide is reciprocated by a crank that is rotatable on the circular slide 15 about an axis 24 parallel to axis 19. The crank comprises a crank disc 25 having a crank pin 26 radially adjustable thereon to vary the stroke of the tool. An adjustable-length connecting rod 27, 28 is pivoted to the crank pin and to a pin 29 on the tool slide. By these several adjustments the stroke of the tool may be of the necessary length and location for a gear of any design within the capacity of the machine. During its cutting stroke the cutting point of the tool moves along a line, such as 31 in Fig. 1, which is perpendicular to and intersects axis 19 at the cone apex of the work gear.

For controlling the motion of the arm 18 about axis 19, the arm has at its distal end a roller 32 which bears on surface 33 of a former 34. This former determines the profile shape of the teeth cut on the gear G. It is detachably secured to a support 35 which is angularly adjustable on frame 10, along circular way 36, about vertical axis 17.

Figure 5:
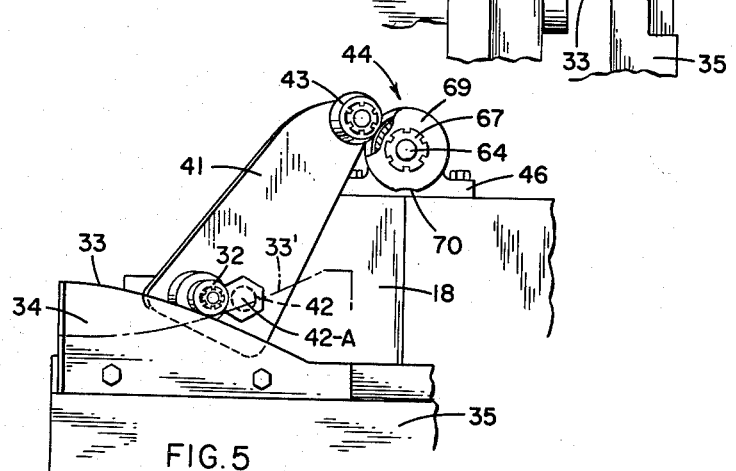
Fig. 5 is an end view of parts shown in Figs. 3 and 4.

The machine is operated by a motor, not shown, mounted on a bracket 37 and driving shaft 38. Through a gear drive train, also not shown, connected to shaft 38, the crank 25, 26 is rotated to reciprocate the tool, and, during the return stroke of each such reciprocation, an infeed between the tool and work is effected by movement of the circular slide 15, and with it arm 18, clockwise in Fig. 1 about axis 17. When this infeed is completed, so that the tip of the tool has cut to line 31 at the bottom of the tooth surface being produced, the slide 15 is withdrawn, counterclockwise about axis 17 in Fig. 1, until the tool is completely clear of the work gear. Thereupon an automatic index mechanism, not shown, but also driven from shaft 38, advances the work spindle and face plate 14 to bring a succeeding tooth space of the work gear into position for cutting. Another tooth cutting cycle is then started, beginning with infeed of the circular slide. During the infeed of each cycle the follower roller 32, moving to the left in Fig. 5, rides up on the former surface 33, to cause the tool to cut the tooth surface to the desired profile shape. After all of the teeth have been cut on one side, the former 34 is replaced by another which has a concave surface 33' for guiding the follower roller 32 during cutting of the other side of the teeth. Throughout its operation the tool T cuts during only one stroke of each reciprocation, and is withdrawn during the return stroke by a clapper mechanism, not shown, which acts between the tool block 23 and the tool. A counterweight arrangement, also not shown, acts to reduce the weight of arm 18 borne by the former.

To this known machine the present invention adds the mechanism now to be described. The former follower roller 32, instead of being supported by a pin that is rigid with arm 18, is rotatable on a trunnion 39 which forms a part of a carrier 41. This carrier is pivoted to the arm by a pin 42 whose axis 42–A is parallel to axis 39–A of the trunnion, which, as may be seen in Fig. 1, is directed toward the common intersection point of axes 13, 17 and 19. The carrier is rocked back and forth on pin 42 by a means operating in time with stroking of the tool so that when a former 34 with convex surface 33 is used the arm is slightly raised as the tool moves from one end to the middle of the tooth, and is lowered by a similar distance as the tool passes from the middle to the opposite end of the tooth, to thereby crown the tooth surface. When a former with a concave surface 33' is being used, to cut the opposite sides of the teeth, the carrier is moved oppositely, to first lower and then raise the arm as the tool traverses the work, also to crown tooth surface.

To obtain this action the carrier 41, which is in effect a lever, carries a follower roller 43 for a cam 44 which is connected to a shaft 45. This shaft is supported by bearing pillows 46 on arm 18 and is parallel to the path of tool slide 21 on the arm. The shaft extends through a gear box 47 which is adjustably secured to the arm, being guided for such adjustment by a guideway 48 on the arm that is parallel to the shaft. The arm has a plurality of tapped holes along the guideway for screws 40 which secure the gear box in the selected position of adjustment. In the gear box there is a bevel gear 49 which is keyed to the shaft 45 for axial motion thereon and meshes with a bevel gear 50 whose shaft 51 is journaled for rotation in the box. Detachably secured to shaft 51 is a spur gear 52 mating with a gear 53 that is detachably keyed to the upper end of a sleeve 54. The sleeve is rotatable on a stud carried by an adjustment block 55 and has detachably keyed to its lower end a gear 56. This gear meshes with a gear 57 detachably keyed to a shaft 58 that is also journaled for rotation in the gear box and has secured to its lower end a gear 59 which meshes with a rack 61 secured to tool block 23. The rack is only slightly longer than the maximum stroke of the tool, but, by the aforementioned adjustment of the gear box 47 along the arm 18, it may be made to mesh with the gear 59 in any position of adjustment of tool block 23 on slide 21 and with any length adjustment of connecting rod 27, 28.

During operation of the machine the reciprocating motion of the tool slide is converted by the rack 61 and gear 59 into reversing rotary motion or oscillation which is transmitted to cam 44 through the drive train including gears 57, 56, 53, 52, 50, 49 and shaft 45. Gears 52, 53, 56, 57 are change gears, and by appropriate selection of them the cam may be made to oscillate through whatever angle is necessary to produce the desired amount of tooth crowning. To provide the center distance adjustment necessary for the change gears, the block 55 is adjustable on arm 62 of a sector 63 which is adjustable angularly in the gear box about the axis of shaft 58.

Figure 3:
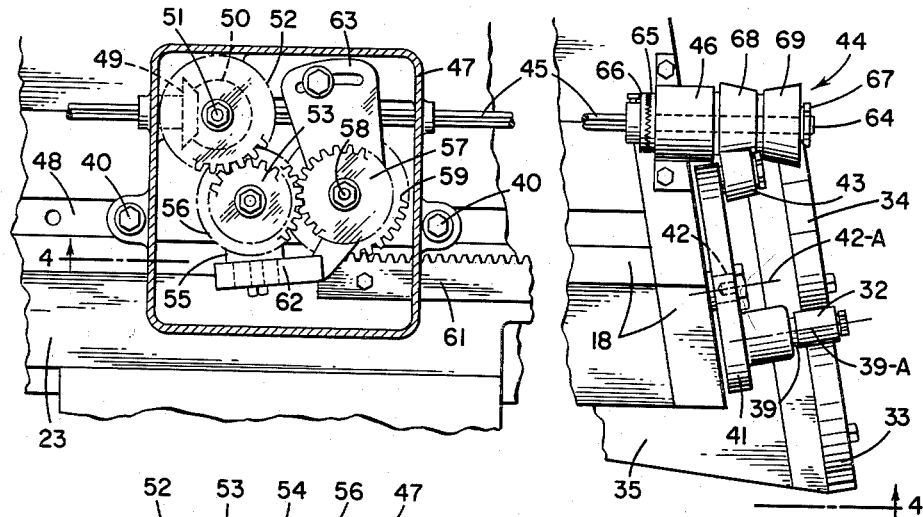
Fig. 3 is a plan view, on a larger scale and partly in section, of the mechanism for actuating the carrier of the former follower.
Figure 4:
Fig. 4 is a front elevation partly in section in plane 4—4 of Fig. 3.

The cam 44 is directly keyed to a shaft 64 which is aligned with shaft 45 and journaled in the bearing pillow 46 shown in Fig. 3. Shaft 64 has on its end opposite the cam a fine-division clutch member 65 whose mating member, 66, is keyed to shaft 45 and is secured by a set screw. After first loosening this screw the clutch 65, 66 may be opened to allow angular adjustment of the cam relative to shaft 45 so that the high point of the crown of the gear teeth may be positioned at the center or other desired position along the teeth.

Upon removal of a securing nut 67 the cam 44 may be removed from its shaft 64 and reversed end-for-end so that either cam surface 68 or 69 may be brought into working position beneath follower roller 43. Surface 68 is used with a former 34 having a convex surface 33, and surface 69 with a former having a concave surface 33'. The high point of surface 68 engages the roller 43 when the tool is at or near the middle of the tooth space being cut, and the surface 68 recedes in both the clockwise and the counterclockwise direction from this high point, preferably at such rate that the tool point will move in a curved path of at least fairly uniform radius as it traverses the face of the gear. Conversely the surface 69 advances in both directions from its low point which engages the follower roller when the tool is at or near the middle of the tooth, and preferably this advance is at a rate which will also produce a fairly uniform radius of crown of the tooth surfaces. Preferably the high and low points of the respective surfaces 68 and 69 are so related to each other, and to the keyway that locates the cam on shaft 64, that end-to-end reversal of the cam will not necessitate its readjustment relative to shaft 45 by means of clutch 65, 66.

The cam face 69 has a recess 70 extending between the high points thereof, with the low point of the recess at the same height as the low center point of the surface. This recess is adapted to seat the follower roller 43 when either or both sides of the teeth are to be cut without tooth crowning action, as for example during the rough cutting of the gear preceding a finish cutting operation. While the roller is in the recess the cam of course must be stationary, and for this purpose its drive is disrupted either by opening the clutch members 65, 66 or by removing one or more of change gears 52, 53, 56, 57. During tooth crowning operation the cam does not turn far enough in either direction for the follower roller to enter the recess.

Having now described the preferred machine embodiment, and its operation, what I claim as my invention is:

1. In a machine for producing gears comprising a work support, a tool support and a tool thereon adapted for reciprocation lengthwise of a tooth to be cut on a gear on the work support, means providing for relative infeed between the tool support and the work support, and a former and a follower therefor for guiding the tool support during said infeed to determine the tooth profile shape, said follower being connected to the tool support for effecting such guiding action, the combination of a carrier for the follower mounted for back and forth motion relative to the tool support for thereby effecting relative motion between the follower and the tool support in a direction to vary the cutting depth of the tool, and means for effecting such back and forth motion in time with reciprocation of the tool, for thereby effecting lengthwise crowning of the gear teeth.

2. A machine for producing gears comprising a frame, a tool guide arm mounted for infeed motion on the frame to move the tool depthwise of the gear tooth being cut, a tool-carrying slide reciprocable on the arm in a direction lengthwise of the tooth, the arm also being movable on the frame in a direction approximately at right angles to the infeed motion and to the slide reciprocation to cause the tool to shape the tooth profile, a former on the frame and a former follower on the arm for effecting such profile shaping motion as the infeed motion proceeds, the former follower being on a carrier which is movable on the arm to effect a supplemental motion of the arm for varying the cutting depth of the tool, and means operable by and upon reciprocation of the slide for moving said carrier back and forth on the arm.

3. A machine according to claim 2 in which said means are so timed with the tool slide reciprocation that the tool has minimum cutting depth at an intermediate point along the tooth and greater cutting depth at the ends of the tooth, to thereby crown the tooth from end to end.

4. A machine according to claim 2 for producing bevel gears in which the infeed motion comprises an angular motion of the tool guide arm relative to the frame about an axis which intersects the cone apex of the gear being cut and is perpendicular to the axis of the gear, and the tooth profile shaping motion comprises an angular motion of said arm relative to the frame about an axis which also intersects said cone apex and is perpendicular to the axis of the infeed motion.

5. A machine according to claim 2 in which said means comprises a cam rotatable on the arm for moving carrier of the former follower, and drive gearing for rotating the cam back and forth in time with reciprocation of the slide.

6. A machine according to claim 5 in which there is a means for adjusting the cam angularly to vary the phase relationship between the reciprocation of the tool slide and said back-and-forth motion of the carrier.

7. A machine according to claim 6 in which said drive gearing comprises a rack on the slide, a pinion meshing with the rack and supported for rotation by the arm, and a drive train connecting the pinion and the carrier for rotation.

8. A machine according to claim 7 in which said drive train includes change gears, whereby the angle of oscillation of the cam may be varied relative to the stroke of the slide.

9. A machine according to claim 7 in which said pinion is mounted on a support which is adjustable along said arm in the direction of slide reciprocation.

10. A machine according to claim 9 in which said drive train includes a shaft extending from said support in the direction of slide reciprocation.

11. A machine according to claim 10 in which the cam is angularly adjustable on said shaft.

12. A machine according to claim 9 in which said change gears are mounted on said support and are arranged to drive the shaft through a gear which is keyed to and is slidable along the shaft.

13. A machine according to claim 5 in which said cam has two cam paths thereon adapted for interchangeable engagement with the carrier of the former follower, one path being adapted to produce an end-to-end crowning of one side of the teeth being cut and the other path to produce such crowning of the opposite side of the teeth.

14. A machine according to claim 5 in which said carrier has a follower for said cam, and the cam has a recess in which this follower may seat when the cam is inoperative.

References Cited in the file of this patent
UNITED STATES PATENTS

| | | |
|---|---|---|
| 2,034,765 | Miller | Mar. 24, 1936 |
| 2,385,330 | Candee et al. | Sept. 25, 1945 |
| 2,385,331 | Carlsen | Sept. 25, 1945 |